(12) United States Patent
Pedmo

(10) Patent No.: US 10,472,118 B2
(45) Date of Patent: Nov. 12, 2019

(54) PLASTIC CONTAINER AND BASE PORTION FOR PLASTIC CONTAINER

(71) Applicant: Plastipak Packaging, Inc., Plymouth, MI (US)

(72) Inventor: Marc Pedmo, Litchfield, OH (US)

(73) Assignee: Plastipak Packaging, Inc., Plymouth, MI (US)

( * ) Notice: Subject to any disclaimer, the term of this patent is extended or adjusted under 35 U.S.C. 154(b) by 67 days.

(21) Appl. No.: 15/248,954

(22) Filed: Aug. 26, 2016

(65) Prior Publication Data

US 2017/0057685 A1 Mar. 2, 2017

Related U.S. Application Data

(60) Provisional application No. 62/210,906, filed on Aug. 27, 2015.

(51) Int. Cl.
*B65D 1/02* (2006.01)

(52) U.S. Cl.
CPC ......... *B65D 1/0276* (2013.01); *B65D 1/0246* (2013.01); *B65D 2501/0018* (2013.01)

(58) Field of Classification Search
CPC .. B65D 79/005; B65D 1/0276; B65D 1/0223; B65D 1/0261; B65D 2501/0036
See application file for complete search history.

(56) References Cited

U.S. PATENT DOCUMENTS

| | | | |
|---|---|---|---|
| 4,134,510 A | 1/1979 | Chang | |
| 4,231,483 A | 11/1980 | Dechenne et al. | |
| 5,004,109 A * | 4/1991 | Bartley | B29C 49/0073 215/373 |
| 6,176,382 B1 | 1/2001 | Bazlur Rashid | |
| 7,900,425 B2 | 3/2011 | Bysick et al. | |
| 7,926,243 B2 | 4/2011 | Kelley et al. | |
| 2008/0257857 A1* | 10/2008 | Ribi | B65D 1/0292 215/381 |
| 2011/0233166 A1* | 9/2011 | Hiromichi | B65D 1/0276 215/370 |
| 2012/0037645 A1* | 2/2012 | Boukobza | B65D 1/0276 220/600 |
| 2015/0136726 A1* | 5/2015 | Nagaoka | B65D 1/0223 215/373 |
| 2017/0362009 A1* | 12/2017 | Godet | B65D 1/0246 |

OTHER PUBLICATIONS

International Search Report, PCT/US2016/049054, dated Nov. 14, 2016.

* cited by examiner

*Primary Examiner* — Shawn M Braden
(74) *Attorney, Agent, or Firm* — Fishman Stewart PLLC

(57) ABSTRACT

A plastic container includes a neck portion, a sidewall portion, and a base including a support ring that extends downward and is configured to support the container on a support surface; a first base portion that extends upwardly from the support ring; a second base portion that extends downwardly from the first base portion; and a reentrant portion that extends upwardly from the second base portion. In embodiments, the container can hold carbonated contents and the sidewall portion may be substantially smooth.

23 Claims, 11 Drawing Sheets

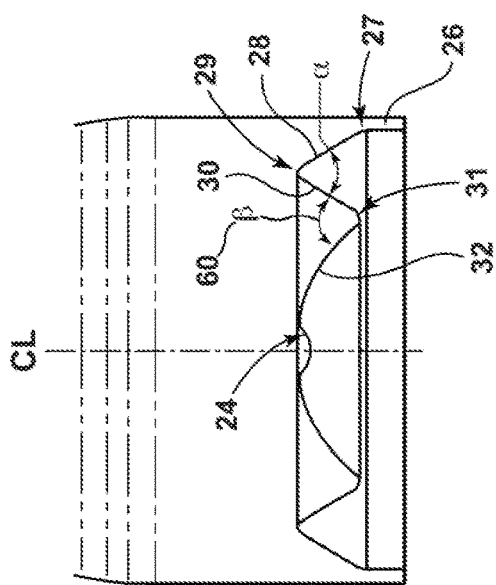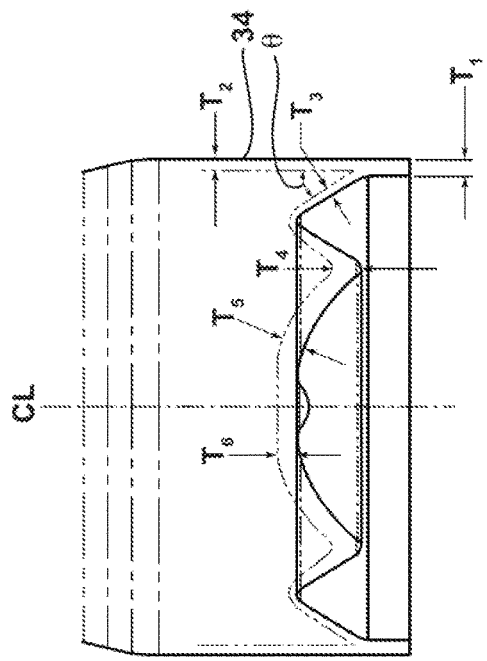
FIG. 5A
FIG. 5B

PLASTIC CONTAINER AND BASE PORTION FOR PLASTIC CONTAINER

CROSS-REFERENCE TO RELATED APPLICATION

This application claims the benefit of priority to U.S. Provisional Application No. 62/210,906, filed Aug. 27, 2015, the entire disclosure of which is incorporated herein by reference.

TECHNICAL FIELD

The present invention relates to plastic containers and base portions for plastic containers, including, without limitation, base portions suitable for plastic containers that are suitable for holding carbonated soft drinks or other beverages.

BACKGROUND

Plastic containers often include a plurality of integral support feet. Such containers are often described as having a "footed" base. Footed bases are commonly used, for example, in applications involving soft drinks and other beverages that have some level of carbonation.

However, among other things, it can be desirable to provide plastic containers for some applications, without a footed base. For some applications, including those involving soft drinks and other beverages that have some level of carbonation, it may also be desirable to provide a container having a generally smooth side wall.

SUMMARY

A plastic container includes a neck portion, a sidewall portion, and a base including a support ring that extends downward and is configured to support the container on a support surface; a first base portion that extends upwardly from the support ring; a second base portion that extends downwardly from the first base portion; and a reentrant portion that extends upwardly from the second base portion. In embodiments, the container can hold carbonated contents and the sidewall portion may be substantially smooth.

BRIEF DESCRIPTION OF THE DRAWINGS

Embodiments of the disclosure will now be described, by way of example, with reference to the accompanying drawings, wherein:

FIG. 5A is a side elevational view of an embodiment of a base generally illustrating certain features/teachings associated with the present disclosure;

FIG. 5B is a side cross-sectional elevational view of an embodiment of a base, such as generally shown in FIG. 5A, illustrating some additional features/teachings associated with the present disclosure;

DETAILED DESCRIPTION

Reference will now be made in detail to embodiments of the present disclosure, examples of which are described herein and illustrated in the accompanying drawings. While the invention will be described in conjunction with embodiments, it will be understood that they are not intended to limit the invention to these embodiments. On the contrary, the invention is intended to cover alternatives, modifications and equivalents, which may be included within the spirit and scope of the invention as described herein and in any appended claims.

Figure 1C:
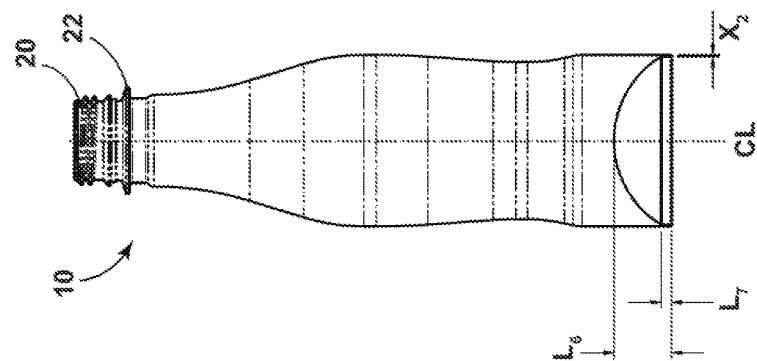
FIG. 1C is another side elevational view of the embodiment of the plastic container illustrated in FIG. 1A, with reference to some additional features associated with the base.
Figure 1B:
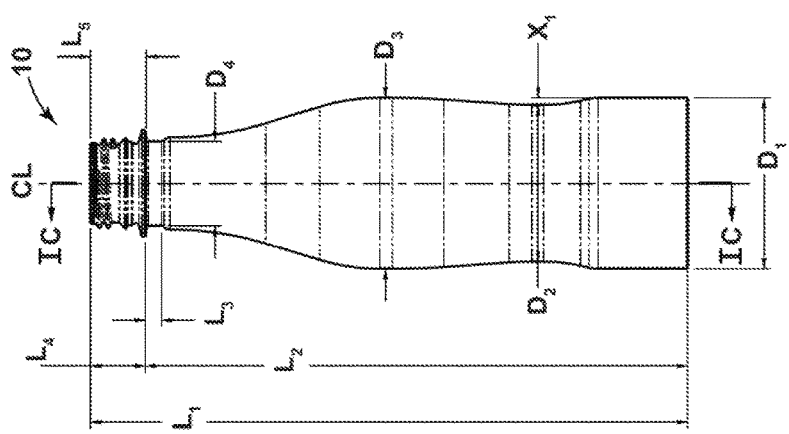
FIG. 1B is a side elevational view of the embodiment of the plastic container illustrated in FIG. 1A.
Figure 1D:
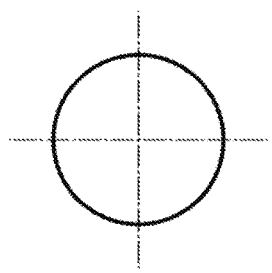
FIG. 1D is a bottom plan view of the embodiment of the plastic container illustrated in FIG. 1A.
Figure 1A:
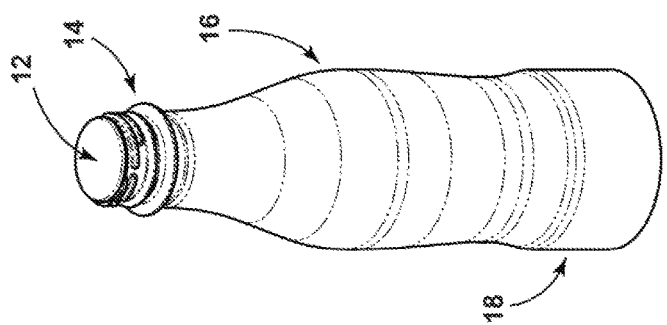
FIG. 1A is a perspective view of an embodiment of a plastic container that incorporates features/teachings of the present disclosure.
Figure 2A:
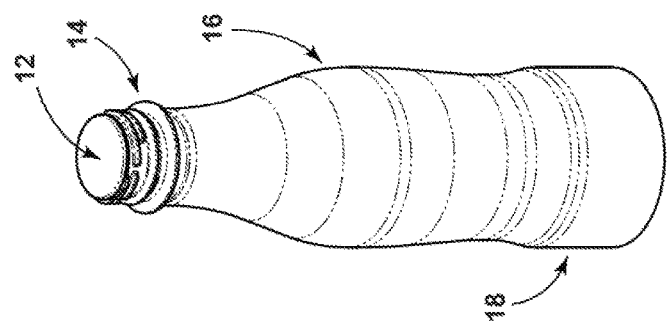
FIG. 2A is a perspective view of an embodiment of a plastic container that incorporates features/teachings of the present disclosure.

With reference to FIG. 1A, a perspective view of an embodiment of a plastic container 10 that incorporates features/teachings of the present disclosure is generally illustrated. The container 10 includes an opening 12 that can serve to fill and/or dispense container contents, a neck portion 14, a sidewall portion 16, and a base 18. The embodiments generally illustrated in FIGS. 2A, 3A, and 4A, generally include similar elements/features, therefore, similar numbers have been used to identify similar elements/features. Additionally, while various specific dimensions, tolerances, and notations are included with reference to embodiments of containers disclosed in the drawings included with this disclosure, such dimensions, tolerances, and notations are intended to be exemplary only, i.e., to assist in the understanding of the features and teachings of the present disclosure, and such dimensions, tolerances, and notations set forth in the drawings are not intended to limit the disclosure.

Figure 1E:
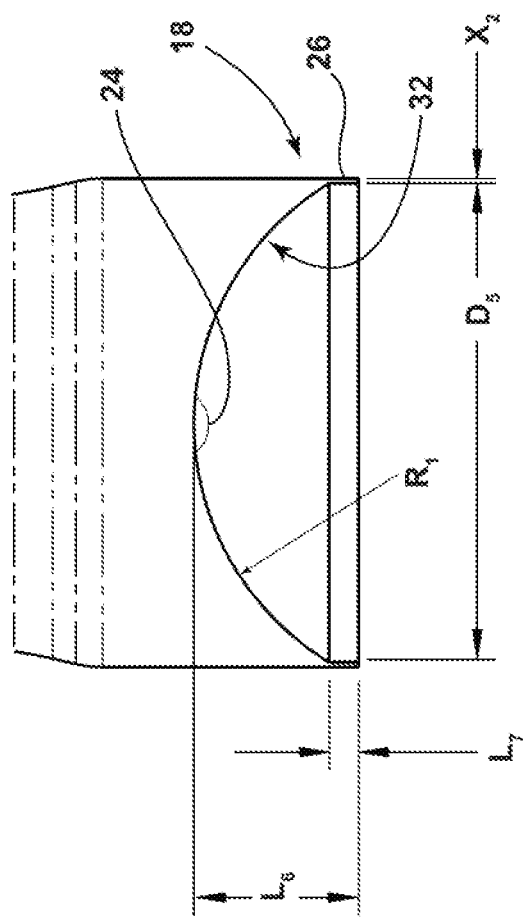
FIG. 1E is an enlarged side elevational view generally illustrating features associated with a base such as shown in FIG. 1C.

As generally illustrated in FIGS. 1C and 1E, the base 18 may include a support ring 26 and a reentrant portion 32. As generally illustrated, the support ring 26 may be annular, and the outer radial surface of the support ring may be substantially flush with the adjacent portion of the base and the sidewall portion. Further, as generally illustrated, embodiments of a base may have a substantially smooth outer radial surface. In an embodiment, the support ring 26 may have a length that extends downwardly that is at least 0.1 inches, and may for example, be about 0.125 inches, and may have a thickness that relatively thin. By way of example and without limitation, the thickness of the support ring 26 may be less than 0.025 inches, and may be about 0.020 inches. With embodiments, a support ring 26 may have a thickness (e.g., $X_2$ in FIG. 1E) that is less than one percent (0.01) of the diameter of the base 18 (e.g., $D_1$ in FIG. 1B).

Figure 2C:
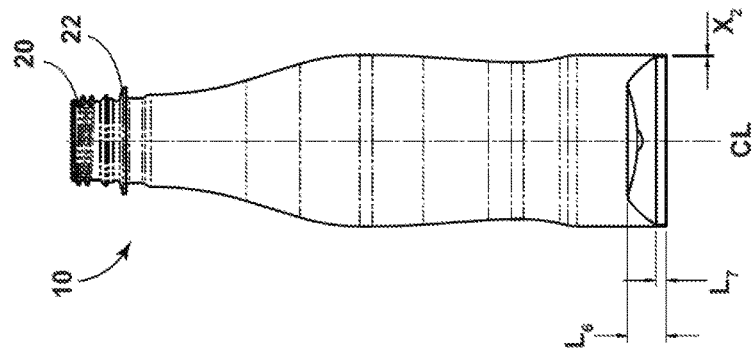
FIG. 2C is another side elevational view of the embodiment of the plastic container illustrated in FIG. 2A, with reference to some additional features associated with the base.
Figure 2B:
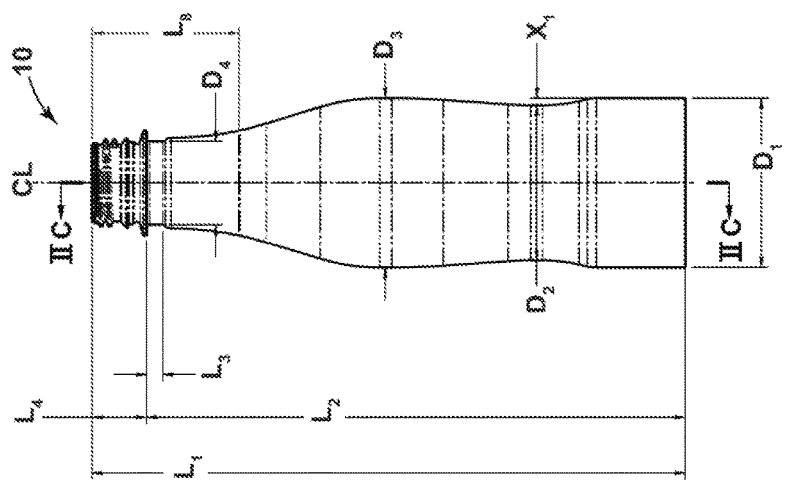
FIG. 2B is a side elevational view of the embodiment of the plastic container illustrated in FIG. 2A.
Figure 2D:
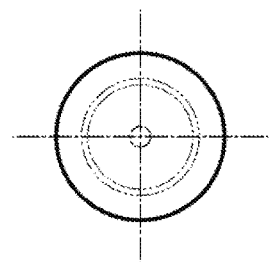
FIG. 2D is a bottom plan view of the embodiment of the plastic container illustrated in FIG. 2A.
Figure 2E:
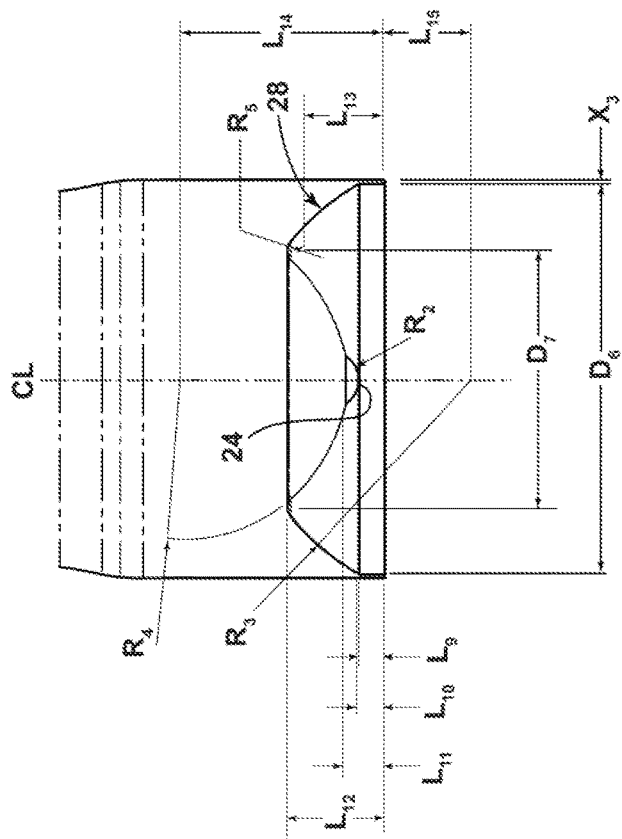
FIG. 2E is an enlarged side elevational view illustrating features associated with the base shown in FIG. 2C.
Figure 2F:
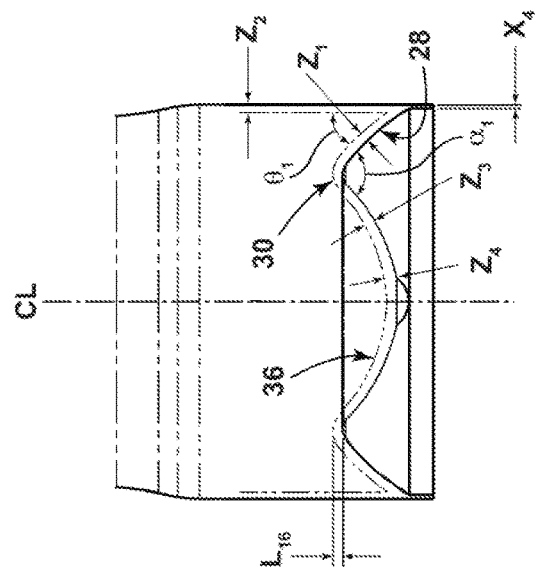
FIG. 2F is an enlarged side elevational view of an embodiment of a base of the type shown in FIG. 2E, generally illustrating thicknesses associated with portions of the base.

Another embodiment of a base 18 is generally illustrated in FIGS. 2C, 2E, and 2F. The base 18 may include a support ring 26, a first base portion 28, and an reverse reentrant portion 36. As generally illustrated, the support ring 26 may be annular, and the outer radial surface of the support ring may be substantially flush with the adjacent portion of the base and the sidewall portion. In an embodiment, the support ring 26 may have a length that extends downwardly that is at least 0.010 inches, and may for example, be about 0.115 inches, and may have a thickness that relatively thin. By way of example and without limitation, the thickness of the support ring 26 may be less than 0.040 inches, and may be about 0.030 inches. With embodiments, a support ring 26 may have a thickness (e.g., $X_4$ in FIG. 2F) that is less than two percent (0.02) of the diameter of the base 18 (e.g., $D_1$ in FIG. 2B).

Figure 3C:
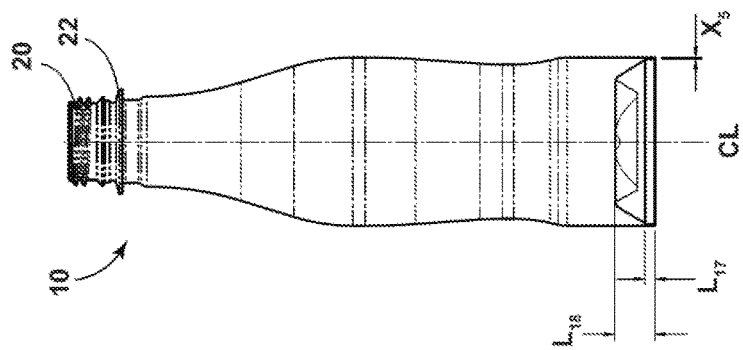
FIG. 3C is another side elevational view of the embodiment of the plastic container illustrated in FIG. 3A, with reference to some additional features associated with the base.
Figure 3B:
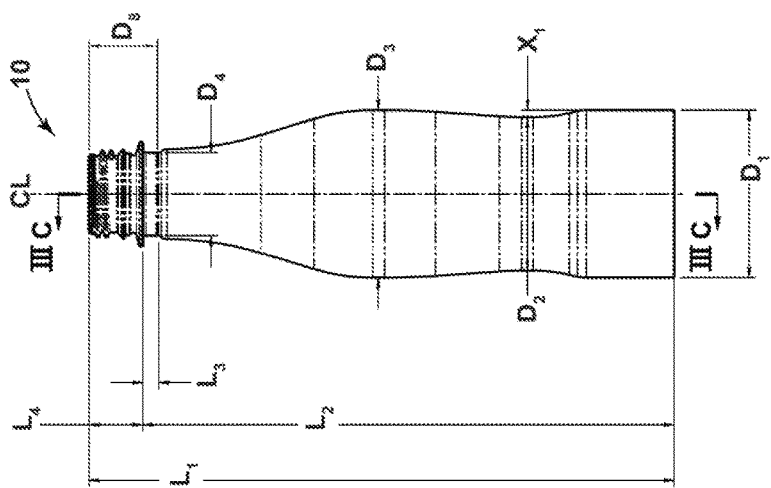
FIG. 3B is a side elevational view of the embodiment of the plastic container illustrated in FIG. 3A.
Figure 3D:
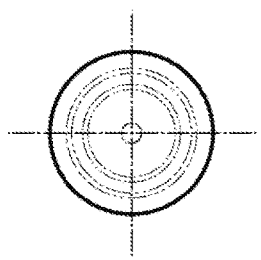
FIG. 3D is a bottom plan view of the embodiment of the plastic container illustrated in FIG. 3A.
Figure 3A:
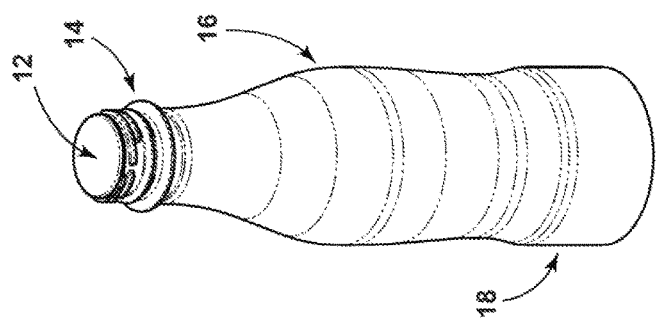
FIG. 3A is a perspective view of an embodiment of a plastic container that incorporates features/teachings of the present disclosure.
Figure 3F:
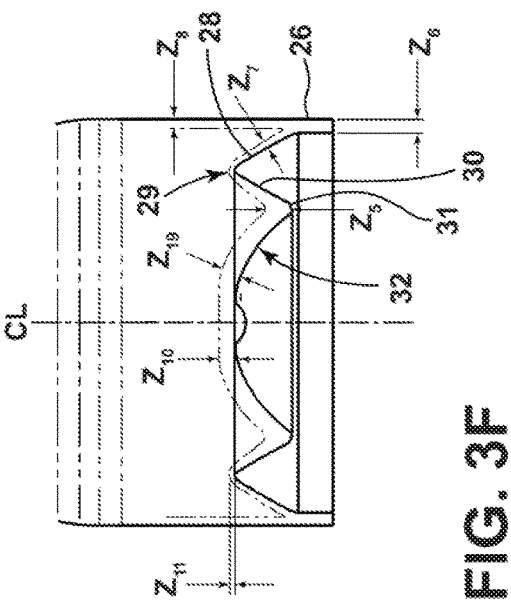
FIG. 3F is an enlarged side cross-sectional elevational view of an embodiment of a base of the type shown in FIG. 3E, generally illustrating thicknesses associated with portions of the base.
Figure 3E:
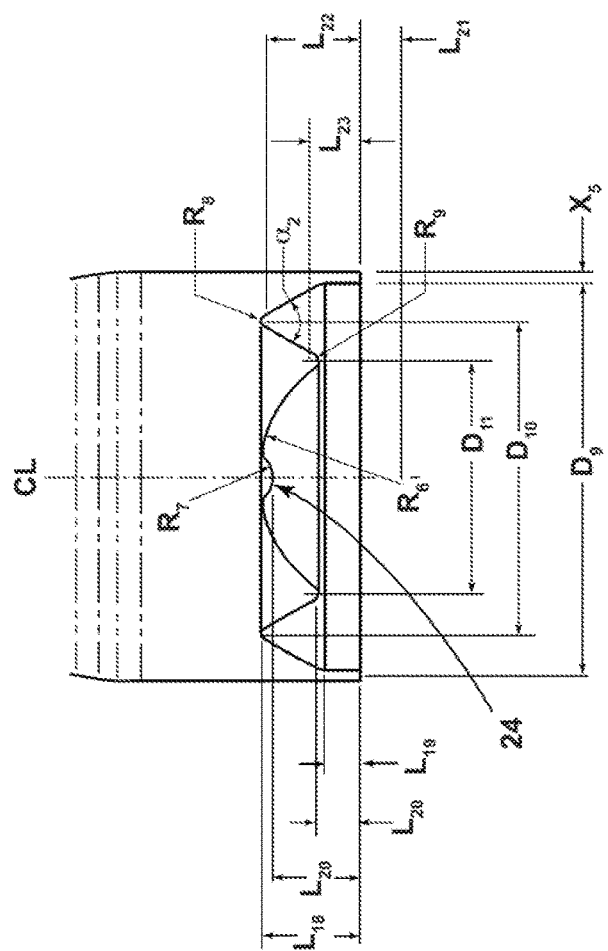
FIG. 3E is an enlarged side elevational view illustrating features associated with the base shown in FIG. 3C.

A further embodiment of a base 18 is generally illustrated in FIGS. 3C, 3E, and 3F. The base 18 may include a support ring 26, a first base portion 28; a first transition portion 29 transitions between the first base portion 28 and the second base portion 30; and a second transition portion 31 transitions between the second base portion 30 and a lower portion of the reentrant portion 32. As generally illustrated, the reentrant portion 32 may be generally hemispherical and may include a portion at or adjacent the centerline of the container that is flat or substantially flat. In an embodiment, the support ring 26 may have a length that extends downwardly that is at least 0.150 inches, and may for example, be about 0.177 inches, and may have a thickness that relatively thin. By way of example and without limitation, the thickness of the support ring 26 may be less than 0.070 inches, and may be about 0.060 inches. With embodiments, a support ring 26 may have a thickness (e.g., $Z_6$ in FIG. 2F) that is less than three percent (0.03) of the diameter of the base 18 (e.g., $D_1$ in FIG. 3B).

Figure 4C:
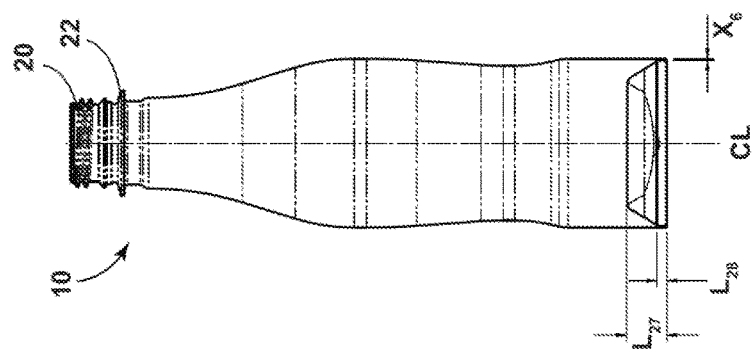
FIG. 4C is another side elevational view of the embodiment of the plastic container illustrated in FIG. 4A, with reference to some additional features associated with the base.
Figure 4B:
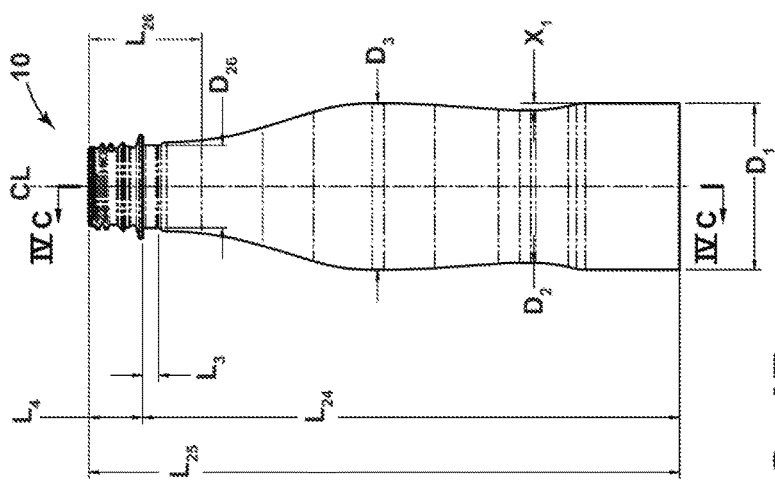
FIG. 4B is a side elevational view of the embodiment of the plastic container illustrated in FIG. 4A.
Figure 4D:
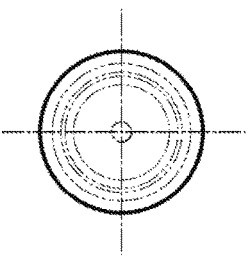
FIG. 4D is a bottom plan view of the embodiment of the plastic container illustrated in FIG. 4A.
Figure 4A:
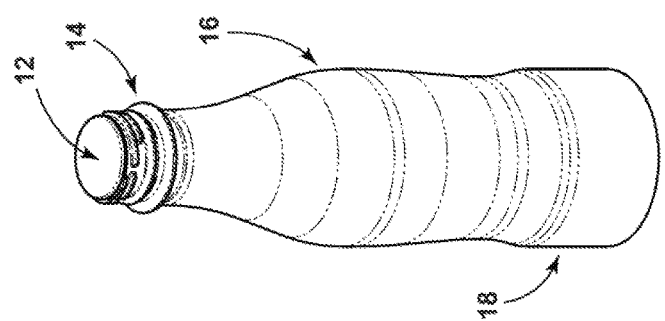
FIG. 4A is a perspective view of an embodiment of a plastic container that incorporates features/teachings of the present disclosure.
Figure 4E:
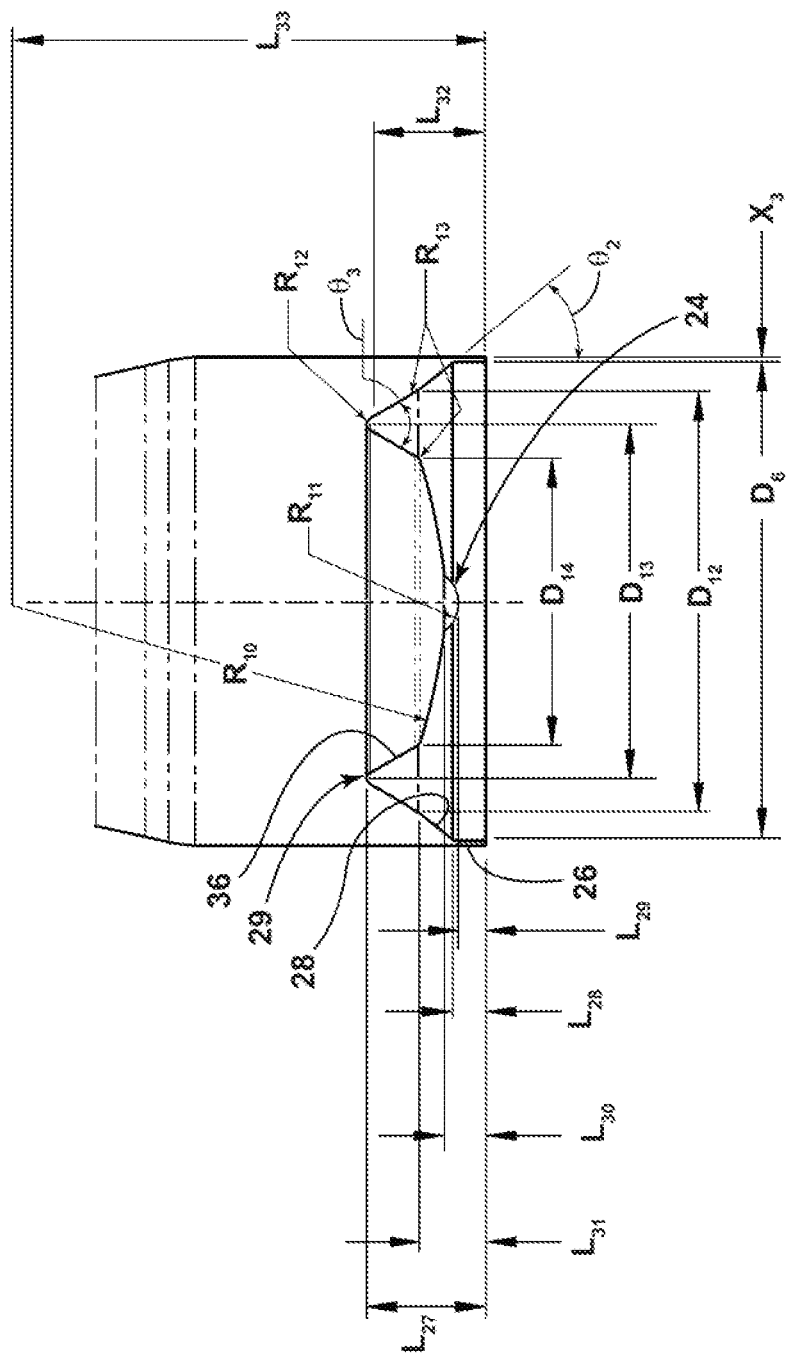
FIG. 4E is an enlarged side cross-sectional elevational view illustrating features associated with the base shown in FIG. 4C.

A further embodiment of a base 18 is generally illustrated in FIGS. 4C and 4E. The base 18 may include a support ring 26, a first base portion 28; a first transition portion 29, and a reverse reentrant portion 36. As generally illustrated, the reentrant portion 32 may have a reverse reentrant shape/configuration, such as generally illustrated in FIG. 4E. As generally illustrated in FIG. 4E, the reverse reentrant portion 36 may include straight segments and one or more curved segments (which may be adjacent the centerline of the container). In an embodiment, the support ring 26 may have a length that extends downwardly that is at least 0.130 inches, and may for example, be about 0.141 inches, and may have a thickness that relatively thin. By way of example and without limitation, the thickness of the support ring 26 may be less than 0.040 inches, and may be about 0.030 inches. With embodiments, a support ring 26 may have a thickness (e.g., $X_3$ in FIG. 4E) that is less than two percent (0.02) of the diameter of the base 18 (e.g., $D_1$ in FIG. 4B).

In embodiments, such as those illustrated, the container 10 may be comprised of polyethylene terephthalate (PET). However, the present teachings are not limited to a specific plastic or polymer material and, with other embodiments, the container may be comprised of various other polymers known in the field of container manufacture including, for example and without limitation, polyethylene (PE), polypropylene (PP), and combinations and blends of two or more polymers. Without limitation, embodiments of plastic containers associated with the present disclosure may comprise a mix or combination of polymers or other materials. Without limitation, embodiments may include a base, or first polymer (e.g., PET), and additional additives, colorants, and/or polymers.

It is noted that the container 10 may also optionally be formed and/or treated using various processes known to be used in connection with plastic containers. For example, and without limitation, the container may, if desired, be heat-treated using various known processes, including those that can improve the ability of a container to be filled with certain contents (e.g., carbonated soft drinks) or to be hot-filled. For instance, in embodiments, portions of the base—such as at or adjacent a standing or support ring—could be welded (e.g., ultrasonically welded) to lock in rigidity.

FIGS. 1B, 2B, 3B, 4B and FIGS. 1C, 2C, 3C, and 4C generally illustrate side elevational views of embodiments of plastic containers 10 embodying teachings of the present disclosure. As generally illustrated in FIGS. 1C, 2C, 3C, and 4C, the neck portion 14 of each container 10 may include a plurality of threads 20 and a support flange 22. FIGS. 1D, 2D, 3D, and 4D generally illustrate bottom plan views of the containers 10 shown in FIGS. 1A, 2A, 3A, and 4A, respectively. FIGS. 1E, 2E, 3E, and 4E generally depicts an enlarged side elevational view of embodiments of the bases of the types generally shown in FIGS. 1C; 2C, 3C, and 4C, respectively. As generally illustrated in the figures, the base 18 may include a centrally-positioned (i.e., relative to the center line of the container CL), downwardly-extending, and substantially curved formation 24. The formation 24 may be generally concave or convex in shape (i.e., including a radius), and may be associated with the molding or forming of the base.

FIGS. 2F and 3F generally illustrate enlarged side cross-sectional elevational views of embodiment of a base of the type generally shown in FIGS. 2E and 3E, respectively. FIGS. 2F and 3F generally illustrate embodiments in which thicknesses associated with portions of the base 18 may be different or varied, for example, at different radial positions (i.e., with reference to the centerline CL of the container 10).

With respect to the container embodiments associated with the drawings in FIGS. 1A through 4E, the illustrated dimensions (and some specific tolerances) may, for example and without limitation, be as follows:

| | | | | | |
|---|---|---|---|---|---|
| D1 | 2.090 ± 0.060 in. / 53.09 ± 1.52 mm | D2 | 1.916 in. / 48.67 mm | D3 | 2.090 ± 0.060 in. / 53.09 ± 1.52 mm |
| D4 | 1.030 in. / 26.16 mm | D5 | 2.050 in. / 52.07 mm | D6 | 2.030 in. / 51.56 mm |
| D7 | 1.350 in. / 34.29 mm | D8 | 0.850 in. / 21.59 mm | D9 | 1.970 in. / 50.04 mm |
| D10 | 1.577 in. / 40.05 mm | D11 | 1.175 in. / 29.84 mm | D12 | 1.792 in. / 45.53 mm |
| D13 | 1.507 in. / 38.27 mm | D14 | 1.221 in. / 31.02 mm | | |
| L1 | 7.280 ± 0.060 in. / 184.92 ± 1.52 mm | L2 | 6.611 in. / 167.92 mm | L3 | 0.197 in. / 5.00 mm |
| L4 | 0.669 in. / 17.00 mm | L5 | 0.680 in. / 17.27 mm | L6 | 0.700 in. / 17.78 mm |
| L7 | 0.125 in. / 3.18 mm | L8 | 1.800 in. / 45.72 mm | L9 | 0.115 in. / 2.92 mm |
| L10 | 0.125 in. / 3.18 mm | L11 | 0.175 in. / 4.45 mm | L12 | 0.474 in. / 12.04 mm |
| L13 | 0.394 in / 10.01 mm | L14 | 1.006 in. / 25.56 mm | L15 | 0.470 in. / 11.95 mm |
| L16 | 0.043 in. / 1.09 mm | L17 | 0.125 in. / 3.18 mm | L18 | 0.488 in. / 12.38 mm |
| L19 | 0.177 in. / 4.49 mm | L20 | 0.209 in. / 5.32 mm | L21 | 0.199 in. / 5.06 mm |
| L22 | 0.458 in. / 11.62 mm | L23 | 0.249 in. / 6.34 mm | L24 | 6.726 in. / 170.84 mm |
| L25 | 7.395 ± 0.060 in. / 187.84 ± 1.52 mm | L26 | 1.390 in. / 35.31 mm | L27 | 0.500 in. / 12.70 mm |
| L28 | 0.141 in. / 3.58 mm | L29 | 0.115 in. / 2.92 mm | L30 | 0.175 in. / 4.45 mm |
| L31 | 0.283 in. / 7.18 mm | L32 | 0.470 in. / 11.94 mm | L33 | 1.960 in. / 49.79 mm |
| R1 | 1.201 in. / 30.51 mm | R2 | 0.156 in. / 3.97 mm | R3 | 1.177 in. / 29.89 mm |
| R4 | 0.831 in. / 21.12 mm | R5 | 0.080 in. / 2.03 mm | R6 | 0.699 in. / 17.76 mm |
| R7 | 0.156 in. / 3.97 mm | R8 | 0.030 in. / 0.76 mm | R9 | 0.040 in. / 1.02 mm |
| R10 | 1.785 in. / 45.35 mm | R11 | 0.156 in. / 3.97 mm | R13 | 0.040 in. / 1.02 mm |
| X1 | 0.087 in. / 2.21 mm | X2 | 0.020 in. / 0.51 mm | X3 | 0.030 in. / 0.76 mm |
| X4 | 0.030 in. / 0.76 mm | X5 | 0.060 in. / 1.52 mm | X6 | 0.030 in. / 0.76 mm |
| Z1 | 0.043 in. / 1.09 mm | Z2 | 0.047 in. / 1.19 mm | Z3 | 0.057 in. / 1.45 mm |
| Z4 | 0.063 in. / 1.60 mm | Z5 | 0.125 in. / 3.17 mm | Z6 | 0.060 in. / 1.52 mm |
| Z7 | 0.043 in. / 1.09 mm | Z8 | 0.040 in. / 1.02 mm | Z9 | 0.110 in. / 2.80 mm |
| Z10 | 0.090 in. / 2.29 mm | Z11 | 0.035 in. / 0.89 mm | | |
| θ1 | 40 degrees | θ2 | 40 degrees | | |
| α1 | 60 degrees | α2 | 60 degrees | α3 | 60 degrees |

With reference to FIGS. 5A and 5B, a base 18 according to embodiments of the disclosure may include a support ring 26 that extends downward and is configured to support the container on a support surface; a first base portion 28 that extends upwardly from the support ring 26; a second base portion 30 that extends downwardly from the first base portion 28; and a reentrant portion 32 that extends upwardly from the second base portion 30. In embodiments, such as illustrated, the support ring 26 may be annular. Additionally, in embodiments, such as generally illustrated, the first base portion 28 may include a segment that is planar or substantially flat, and the second base portion 30 may include a segment that is planar or substantially flat. In embodiments, a support ring transition 27 (which may be a point or segment) transitions between the radially inward upper portion of support ring 26 and first base portion 28; a first transition portion 29 transitions between the first base portion 28 and the second base portion 30; and a second transition portion 31 transitions between the second base portion 30 and a lower portion of the reentrant portion 32.

As generally shown in FIG. 5A, an angle α may be identified between the first base portion 28 and the second base portion 30, and an angle β may be identified between a portion of the second base portion 30 and a lower wall portion of the reentrant portion 32. Additionally, with reference to FIG. 5B, an angle Θ may be identified between an outer surface of the first base portion 28 and a portion of the base 34 that extends upwardly toward the sidewall portion 16. In embodiments, angle α and an angle β may be the same or may be substantially within the same range. For example, in embodiments, angle α and an angle β may each be about 60°±2°. Moreover, in embodiments, angle Θ may be about one-half the angle of angle α and/or angle β.

As generally illustrated in FIG. 5B, and without limitation, in an embodiment an upper portion of the reentrant portion 32 may have a segment that is flatter, i.e., has less of a curve than the downwardly-extending side portions of the reentrant portion. Additionally, in embodiments, the thicknesses at various portions of the base may vary along their respective lengths and/or may be different than thicknesses of various other base portions or segments. For example and without limitation, in the embodiment illustrated in FIG. 5B, thicknesses at identified positions $T_1$, $T_2$, $T_3$, $T_4$, $T_5$, and $T_6$ may all be different. In embodiments, the thickness of a significant portion or segment of the reentrant portion 32 may be significantly greater than the thicknesses associated with a lower portion of the sidewall, the support ring 26, the first base portion 28, and the second base portion 30. For some embodiments, the thickness of a significant portion or segment of the reentrant portion 32 may be at least twice as thick as the thicknesses associated with a lower portion of the sidewall and the first base portion 28.

The base configurations disclosed can provide some advantageous functionality. For example and without limitation, with carbonated soft drinks, pressure can be exerted in a downward direction in a base of a container. With embodiments of the present disclosure, because of the somewhat triangular shape of portions of the base (as generally viewed in cross section in the figures), the pressure can be deflected and, to a material or significant degree, offset and/or evenly distributed. Moreover, in embodiments (e.g., in FIGS. 5A and 5B) in which angle α and an angle β are the same or are substantially within the same range, and are also generally adjacent and directed in opposing directions, the configuration can help create a balance or equalization of internal and external pressure forces with the base. Such a balance or equalization can, among other things, help prevent movement or undesirable deflection of the base while requiring less material (or thickness) in portions of the base, such as the first base portion and second base portion. Similarly, with respect to other embodiments, such as generally illustrated in FIG. 2F, angle $Θ_1$ can be coordinated with angle $α_1$ to provide a similar effect. For example and without limitation, in embodiments angle Θ may be about one-half angle α.

With embodiments, the sidewall 16 of the container may be smooth or substantially smooth, even when used in connection with carbonated contents. For example, embodiments of container following teachings of the present disclosure may be used for contents such as carbonated beverages without requiring sidewall reinforcement, such as the inclusion of strengthening ribs. In some embodiments, the smooth or substantially smooth sidewall may have an appearance that may mimic an aluminum or glass bottle or container.

For example and without limitation, an embodiment of a container having a configuration generally illustrated in FIGS. 1A-1E or FIGS. 2A-F may hold contents (including carbonated contents) of approximately 8.5 fluid ounces, may hold 170 psi or more, and may have a weight of 21.1 grams, 20.5 grams, 19.9 grams, or less; and embodiments of containers having a configuration generally illustrated in FIGS. 3A-3F or 4A-4E may hold contents (including carbonated contents) of approximately 8.5 fluid ounces, may hold 170 psi or more, may have a weight of 28.6 grams, 28.0 grams, 27.4 grams, or less. However, it is again noted that while certain dimensions, tolerances, and notes are included in the drawings and this disclosure, the teachings of the present disclosure, including those specifically directed to the base, are applicable to various other containers of various sizes, shapes, and configurations.

Figure 6C:
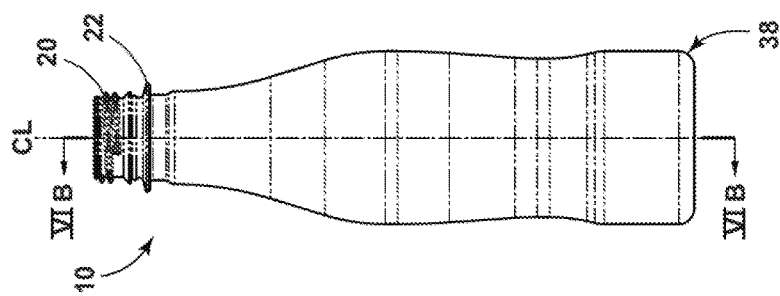
FIG. 6C is another side elevational view of the embodiment of the plastic container illustrated in FIG. 6A, with reference to some additional features associated with the base.
Figure 6B:
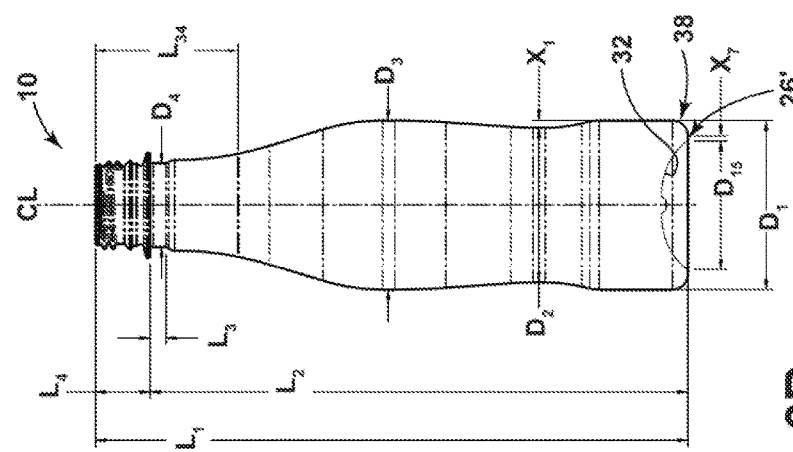
FIG. 6B is a side elevational view of the embodiment of the plastic container illustrated in FIG. 6A.
Figure 6D:
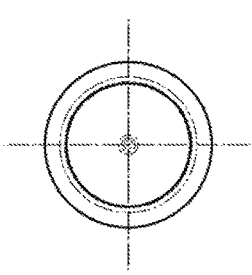
FIG. 6D is a bottom plan view of the embodiment of the plastic container illustrated in FIG. 6A.
Figure 6A:
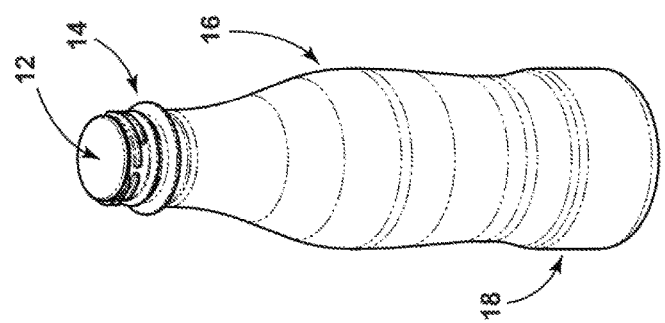
FIG. 6A is a perspective view of an embodiment of a plastic container that incorporates features/teachings of the present disclosure.

A further embodiment is generally illustrated in FIGS. 6A through 6D. With reference to FIG. 6A, the container 10 includes an opening 12 that can serve to fill and/or dispense container contents, a neck portion 14, a sidewall portion 16, and a base 18. This embodiment can avoid the use of an overstroke in connection with the molds. The base 18 associated with this embodiment of a container is generally of the type referred to as a "champagne"-type base. This embodiment may include a heel (i.e., an outer bottom edge/portion that contacts a support surface) that is relatively smaller when compared to conventional containers with a similar base structure. Employing a smaller heel radius may allow the container to have a "smooth" wall look or appearance. Moreover, embodiments of containers produced in accordance with the present teachings, which may be suitable for carbonated contents, can exhibit a sidewall with a smooth, aluminum-like or glass-like appearance without requiring conventional footed base structures.

With reference to FIG. 6B, and by way of example and without limitation, with an embodiment several container dimensions may be similar to the dimensions associated with the embodiment of a container generally depicted in FIG. 1B. That is, in the non-limiting embodiment of a container shown in FIG. 6B, dimensions $D_1$, $D_2$, $D_3$, $D_4$, $L_1$, $L_2$, $L_3$, and $X_1$ may be as previously disclosed in connection with the embodiment associated with FIG. 1B. For example, in the exemplary embodiment of FIG. 6B, $D_{15}$ may be 1.589 in. (40.36 mm), $L_{34}$ (to the fill line) may be 1.75 in. (44.45 mm), and $X_7$ may be 0.063 in. (1.60 mm).

As generally illustrated in FIG. 6B, in an embodiment the base 18 may include a curved outer radial segment 38, a support ring 26', and a reentrant portion 32. Support ring 26' is the surface of the base that contacts a support surface. With embodiments, the support ring 26' may have an annular length (e.g., $X_7$ in FIG. 6B) that is about three percent (0.03) of the diameter of the base 18 (e.g., $D_1$ in FIG. 6B).

FIGS. 7A through 7D generally illustrate an embodiment of preform 40 that may be used to manufacture a container as described in connection with embodiments of containers disclosed herein, including the container illustrated in FIGS. 6A-6D. In embodiments, the preform 40 may include a ring 50 provided on the outer diameter of the preform body, such as generally illustrated. In an embodiment, without limitation, the ring 50 may have an outer radial diameter that is about 20 percent (or more) greater than the outer radial diameter of adjacent portions of the preform above the ring 50. The preform 40 may be made, for example, using split cavity technology—see, e.g., the parting line PL indicated in connection with FIG. 7D. In an embodiment the ring 50 may be blow molded into the heel to be formed in the resulting container, where additional thickness may be desirable. At the same time, the preform thickness may remain comparatively thin in other areas of the base, where additional thickness may not be necessary or desirable.

Figure 7B:
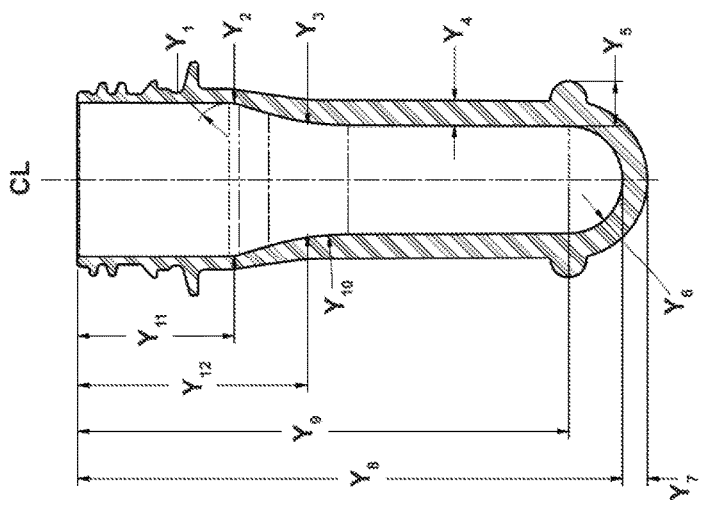
FIG. 7B is a side cross-sectional view of the preform illustrated in FIG. 7A.
Figure 7D:
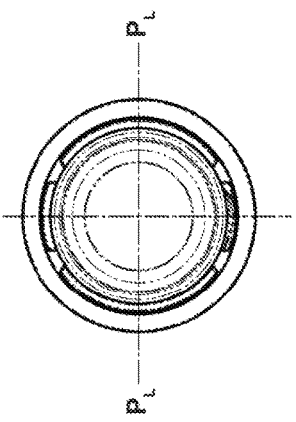
FIG. 7D is a top view of the preform illustrated in FIG. 7A.
Figure 7A:
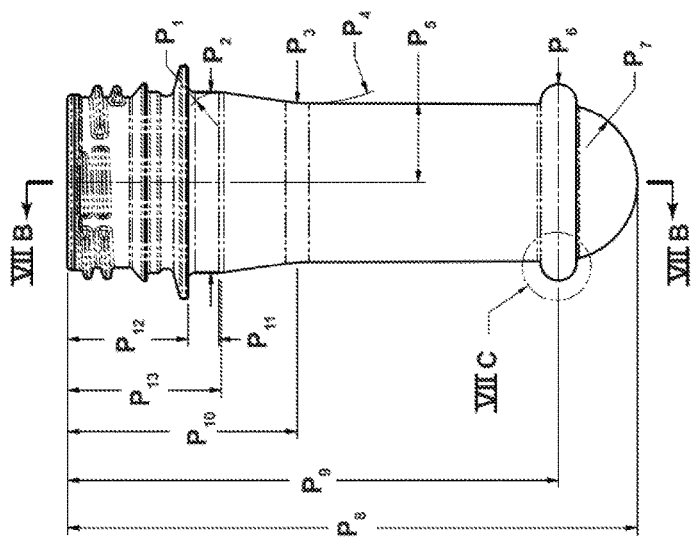
FIG. 7A is a side elevational view of an embodiment of a preform incorporating features/teachings of the present disclosure.
Figure 7C:
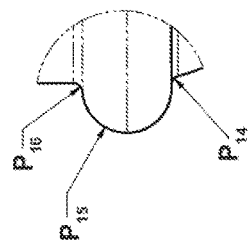
FIG. 7C is an enlarged view of a portion of the preform illustrated in FIG. 7A.

With reference to the embodiment of a preform illustrated in FIGS. 7A and 7B, the illustrated dimensions may, for example and without limitation, be as follows:

| | | | | | |
|---|---|---|---|---|---|
| P1 | 0.197 in. 5.00 mm | P2 | 1.010 in. 25.65 mm | P3 | 0.888 in. 22.56 mm |
| P4 | 0.951 in. 24.15 mm | P5 | 0.25 degree (taper) | P6 | 1.097 in. 27.86 mm |
| P7 | 4.380 in. 11.12 mm | P8 | 3.173 in. 80.59 mm | P9 | 2.735 in. 69.47 mm |
| P10 | 1.280 in. 32.52 mm | P11 | 0.171 in. 4.34 mm | P12 | 0.669 in. 17.00 mm |
| P13 | 0.854 in. 21.70 mm | P14 | 0.020 in. 0.50 mm | P15 | 0.100 in. 2.53 mm |
| P16 | 0.020 in. 0.50 mm | Y1 | 0.197 in. 5.01 mm | Y2 | 0.853 in. 21.67 mm |
| Y3 | 0.609 in. 15.48 mm | Y4 | 0.139 in. 3.54 mm | Y5 | 0.250 in. 6.35 mm |
| Y6 | 0.298 in. 7.58 mm | Y7 | 0.138 in. 3.51 mm | Y8 | 3.035 in. 77.08 mm |
| Y9 | 2.736 in. 69.50 mm | Y10 | 1.575 in. 40.00 mm | Y11 | 0.871 in. 22.11 mm |
| Y12 | 1.281 in. 32.55 mm | | | | |

The foregoing descriptions of specific embodiments of the present invention have been presented for purposes of illustration and description. They are not intended to be exhaustive or to limit the invention to the precise forms disclosed, and various modifications and variations are possible in light of the above teaching. The embodiments were chosen and described in order to explain the principles of the invention and its practical application, to thereby enable others skilled in the art to utilize the invention and various embodiments with various modifications as are suited to the particular use contemplated. It is intended that the scope of the invention be defined by the claims and their equivalents.

What is claimed:

1. A plastic container configured to hold carbonated contents, the plastic container comprising:
    a neck portion;
    a sidewall portion extending below the neck portion, the sidewall portion being substantially smooth; and
    a base extending below the sidewall portion, the base including:
        an annular support ring that extends downward and is configured to support the container on a support surface; and
        a reentrant portion disposed about a centerline of the plastic container that extends upwardly from the support ring;
    wherein a thickness of the support ring is greater than a thickness of the sidewall portion; and the thickness of the annular support ring is about 50% greater than the thickness of the sidewall portion.

2. The plastic container of claim 1, wherein the reentrant portion is curved.

3. The plastic container of claim 1, wherein the reentrant portion has a substantially hemispherical shape.

4. The plastic container of claim 1, wherein the reentrant portion includes a downwardly-extending substantially curved formation at or about a centerline of the container.

5. The plastic container of claim 1, wherein the base has a substantially smooth outer radial surface.

6. The plastic container of claim 1, wherein the support ring is substantially flush with the sidewall portion.

7. The plastic container of claim 1, wherein the reentrant portion comprises a curved surface.

8. The plastic container of claim 1, wherein the reentrant portion includes a downwardly-extending substantially curved formation at or about a centerline of the container.

9. The plastic container of claim 1, wherein the base has a substantially smooth outer radial surface.

10. The plastic container of claim 1, wherein the annular support ring includes a height of about 4.5 mm.

11. The plastic container of claim 1, wherein the neck portion, the sidewall portion, and the base are configured to hold at least 170 psi, are configured to hold about 8.5 fluid ounces of carbonated contents, and have a total weight of 21.1 grams or less.

12. A plastic container configured to hold carbonated contents, the plastic container comprising:
    a neck portion;
    a sidewall portion extending below the neck portion, the sidewall portion being substantially smooth; and
    a base extending below the sidewall portion, the base including:
        an annular support ring that extends downward and is configured to support the container on a support surface; and
        a reentrant portion disposed about a centerline of the plastic container that extends upwardly from the support ring;
    Wherein a thickness of the support ring is greater than a thickness of the sidewall portion;
    wherein an outer diameter of the reentrant portion is at least 50% of an outer diameter of the base.

13. The plastic container of claim 12, wherein the reentrant portion is curved.

14. The plastic container of claim 12, wherein the reentrant portion has a substantially hemispherical shape.

15. The plastic container of claim 12, wherein the reentrant portion includes a downwardly-extending substantially curved formation at or about a centerline of the container.

16. The plastic container of claim 12, wherein the base has a substantially smooth outer radial surface.

17. The plastic container of claim 12, wherein the support ring is substantially flush with the sidewall portion.

18. The plastic container of claim 12, wherein the reentrant portion comprises a curved surface.

19. The plastic container of claim 12, wherein the reentrant portion includes a downwardly-extending substantially curved formation at or about a centerline of the container.

20. The plastic container of claim 12, wherein the base has a substantially smooth outer radial surface.

21. The plastic container of claim 12, wherein the annular support ring includes a height of about 4.5 mm.

22. The plastic container of claim 12, wherein the neck portion, the sidewall portion, and the base are configured to hold at least 170 psi, are configured to hold about 8.5 fluid ounces of carbonated contents, and have a total weight of 21.1 grams or less.

23. The plastic container of claim 12, wherein the thickness of the annular support ring is about 50% greater than the thickness of the sidewall portion.

* * * * *